United States Patent Office 3,510,964
Patented May 12, 1970

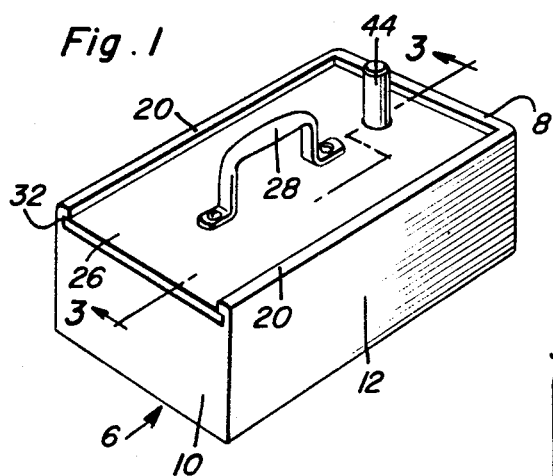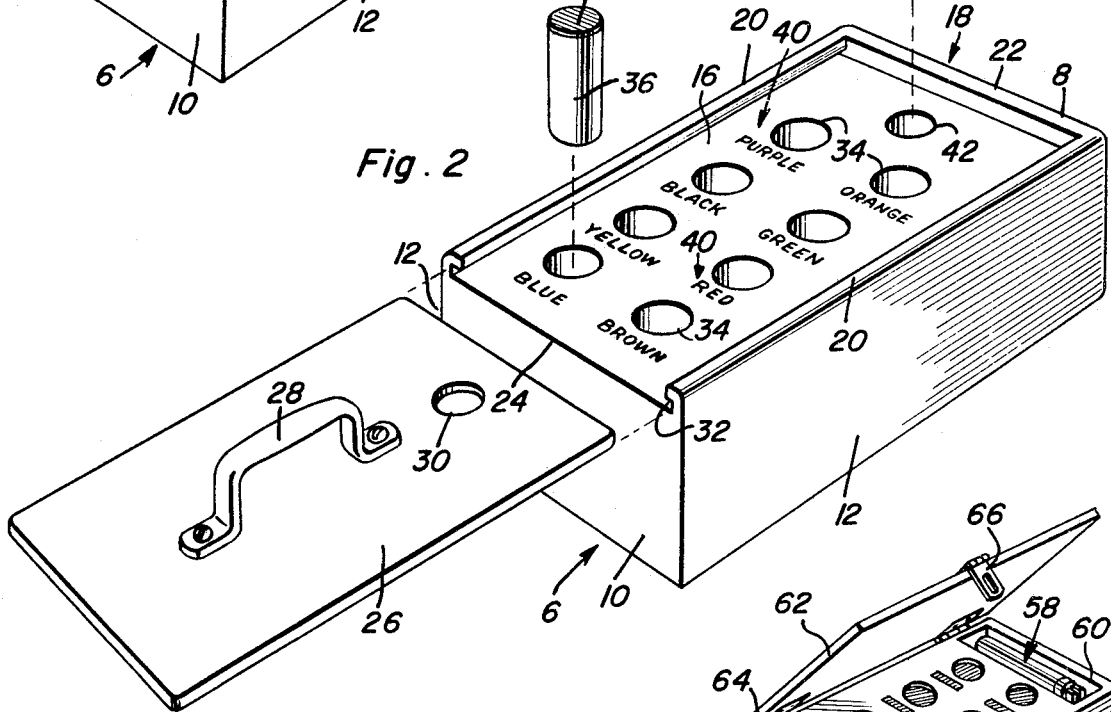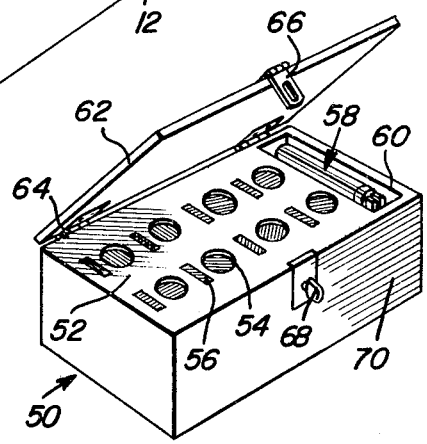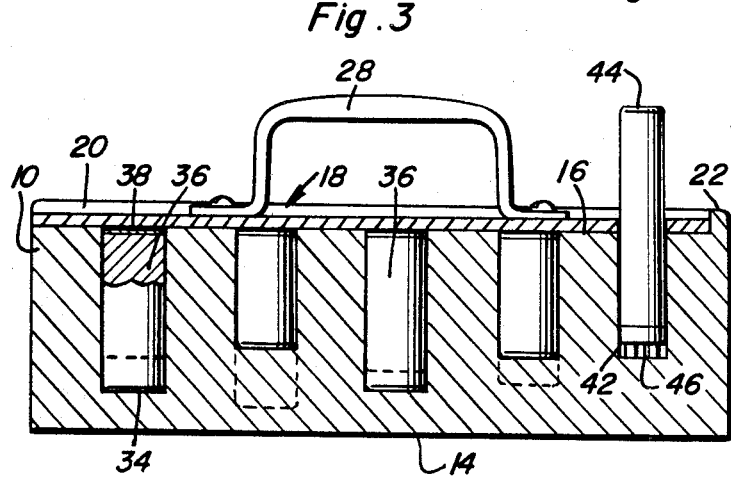

3,510,964
EDUCATIONAL COLOR CASE
Laurence A. Dahners and Thelma May Dahners, both of
P.O. Box 1475, Clifton, Ariz. 85533
Filed June 8, 1967, Ser. No. 644,691
Int. Cl. G09b 19/00
U.S. Cl. 35—22                           7 Claims

ABSTRACT OF THE DISCLOSURE

An educational toy designed and adapted to teach colors by visual color recognition, descriptive name, either or both, and which in addition, functions as a puzzle. It enables a child to puzzle out and understand the sequential steps involved in solving the problem of (1) recognizing not only basic colors (2) variations in sizes and shapes (3) distinctively colored indicia (marker labels and symbols) and (4) distinguishable color names and how they are spelled and appear in written or printed form.

---

This invention relates to certain new and useful improvements in an educational toy, also designated as a portable color case, and which has to do with a rectangular or an equivalent self-standing block which has a plurality of vertical closed-bottom sockets or holes of varying depth formed therein for reception and temporary retention of selectively insertable pegs of varying length and distinctively colored and which fit flush with the top of the block when telescopingly inserted in correctly chosen sockets.

In carrying out the concept the pegs are preferably, but not necessarily, designated and colored to conform with the colors currently found in crayon sets for small children, usually eight in number and commonly identified as green, blue, purple, yellow, orange, red, black and brown. This unique toy lends itself to interesting and informative use by pre-school youngsters and those attending kindergarten and the first grade. It features many novel characteristics as will be hereinafter set forth.

In the instant invention a certain and suitably colored peg aptly fits into a hole or socket expressly designed therefor, said socket, that is the mouth portion, being individually designated by a color strip such as a label which coincides with the socket or, alternatively, by a name which is inscribed or printed and designates the color. Both color strip and name, if desired, may be used. In the adaptation shown the pegs will be flush with the top surface of the block only if they are in the correct sockets or holes and they will drop in loosely without having to be hammered. If they are correctly placed a lid may be slid or closed over them. If not correctly pocketed the pins will of course not be flush and the lid would not slide in the means provided therefor, or swung to a closed position if hinged. The invention also features the idea of a penalty, so to speak, for not recognizing, or a reward for recognizing, a particular color and thereby matching it with the color strip or color name as the case may be. The invention is characterized by a portable self-standing block having an upwardly facing top side and wherein peg receiving sockets open through the top and are appropriately arranged for reception and retention of a plurality of selectively insertable and removable pegs of distinguishably different colors and lengths.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of an educational color-type case, block or toy constructed in accordance with the invention showing the handle-equipped lid closed and the extracting tool or implement projecting up through a hole in the lid and keeping the same closed.

FIG. 2 is a view in perspective on an enlarged scale showing the lid, special purpose block, one of the pegs and the extracting tool or implement.

FIG. 3 is a central longitudinal sectional view with parts in elevation on an enlarged scale taken on the plane of the section line 3—3 of FIG. 1 looking in the direction of the arrows.

And FIG. 4 is a view in perspective on a small scale showing a hinged lid and with certain other modifications.

By way of introduction to the description of the views of the drawing it is to be pointed out that basically the same generic concept is disclosed in FIGS. 1 to 3 and FIG. 4.

Reference being had to FIGS. 1, 2 and 3, it will be seen that the toy proper may comprise a suitable portable body which is herein referred to as a self-standing block 6. The block may be of wood, plastic material or whatever the manufacturer decides upon. The block is here shown as rectangular or oblong and has a rearward transverse face 8, a forward transverse end or face 10 and spaced parallel sides 12. The flat bottom 14 (FIG. 3) makes the block self-standing when placed on a table or other surface. The top wall or surface is also flat and is designated by the numeral 16 (FIG. 2). This upper portion is preferably provided with an encompassing substantially U-shaped frame or rim which is denoted at 18 and embodies a pair of spaced parallel coplanar longitudinal members 20 connected at like ends by an intervening transverse end member 22. One end portion of the block is thus open as denoted at 24 to accommodate an insertable and removable cover or lid 26. This lid is a simple rectangular panel which is provided on a central portion with a handle or handgrip 28 and which has a special purpose hole at 30. This panel or lid is adapted to be inserted to assume the closed position shown in FIGS. 1 and 3 and to accomplish this the frame or rim members are provided on interior sides with grooves 32 which constitute keyways for the lid.

With more particular reference to the body portion of the block it will be seen that it is provided with rows of holes which are here more specifically referred to as closed-bottom sockets all of which are denoted by the numeral 34. These sockets are of different depths but are all of the same circular cross-sectional dimension. They open through the top surface to receive a selected one of the insertable and removable pins or pegs 36. There will be a corresponding number of pegs and sockets. The depths or lengths of the sockets vary as shown in FIG. 3. Also the pegs vary in length so that it is necessary to correctly match the pegs with the sockets in order to achieve the finished lid-closing result shown for example in FIG. 3. Stated otherwise, unless the correct pegs are in the correct holes or sockets the lid cannot be closed. In actual practice the pegs can be made of magnetizable metal and the upper end can be covered with a color disk 38 or the color scheme can be attained in any practical and commercial manner. In any event the pegs are made to fit the holes or sockets and in practice each socket is identified by color indicia. As before stated, the indicia can be a sticker, label, or a printed symbol or both. For example, in FIG. 2, the color clue or code is obtained by printing or inscribing the color names or legends 40 on and in association with each socket in the manner illustrated. The extra socket or hole 42 at the right in FIG. 2 is to receive the relatively long and slender and therefore distinguishable extracting tool or implement 44. This tool is of a length that the upper end extends through and beyond the hole 30 in the lid as shown in FIG. 1, that is, assuming that all of the correct pegs are in the proper holes and the lid is in place. The bottom of the tool 44 or implement is provided with a permanent magnet 46 to extract misplaced pegs.

In some instances the implement 44 has been referred to as a wand and can be actually employed to include a suction cup (not shown) or for that matter Velcro tape. This "wand" is used for recovery or retrieving purposes that is for the removal of short pegs from deep holes. So that a child will have a desire to finish the project of putting all the pegs in the right holes the lid is included and is such that it will slide in the grooves over the top of the peg block. If the pegs were in the wrong holes the lid would not slide into place. It is to be pointed out however that the sliding lid is not limiting and for this reason the lid can be hinged in the manner shown in FIG. 4. As stated, when the wand is in the hole 30 as shown in FIG. 1 it will hold the lid in place and will encourage the child to keep the entire toy together. The handle 28 is added to provide interest and so that the child can carry the toy about as he would a small suitcase. This will encourage the child to put all of the pegs in the proper order, put the lid on, and then carry the toy to someone for approval.

Referring now to the modification shown in FIG. 4, the portable block is designated by the numeral 50 and has corresponding surfaces such as already described and is accordingly characterized by a top or upper surface 52 provided with rows of sockets 54 which correspond with the aforementioned sockets or receivers 34. Here instead of printing the words or names 40 as shown in FIG. 2 the color for each socket is designated by either a name plate, label, strip or printed color band 56. As already stated, it is within the purview of the invention to use names 40 and also labels and to paste the labels over the names and at a proper time to remove the labels so that the names appear. The retrieving or recovery tool or implement is here denoted by the numeral 58 and instead of fitting into a socket 42 it is fitted into a horizontal suitably recessed storage cavity 60. The lid or cover instead of being slidable and removable is hinged. The lid here is denoted at 62 and is hinged in place at 64, has a hasp 66 hingedly mounted and engageable with a keeper or latch 68 on the block wall 70. The generic and specific characteristics of the two embodiments of the invention will therefore be evident.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in assisting a child to acquire the skill and ability needed in identifying and visually differentiating between basic colors and hues of the spectrum; an educational toy which features (1) a penalty for not recognizing and (2) a reward for recognizing matchable colors comprising, a portable self-standing block having an upwardly facing top side and provided with a plurality of selectively usable spaced peg receiving closed-bottom sockets of distinguishably different depths and having upper ends opening through said top side, each socket being provided with distinctive color indicia, a corresponding plurality of selectively insertable and removable individual pegs of distinguishably different colors and lengths, there being a single prescribed peg of correct length for each companion socket, the color of each peg matching the color indicia of its companion socket, whereby when the proper pegs are inserted in their proper sockets, the child merits recognition for a task well done, all of said sockets being of the same cross-sectional dimension, and all of said pegs being of like cross-sectional dimension compared to each other, the cross-sectional dimension of said sockets being slightly greater than the cross-sectional dimension of said pegs, said sockets being spaced apart, being vertical during normal use, the predetermined depth variations of said sockets being arbitrarily arranged in a manner to puzzle the user as to which sockets are deep, shallow, or in-between deep and shallow, the top side of said block being provided with a manually manipulatable openable and closable lid, means operatively mounting said lid on said top side, said lid being adapted to span said top side in close proximity to the coacting surface of said top side and in this manner to close the upper open ends of all of the sockets when all of the pegs have been properly placed in their correctly cooperable predetermined sockets, whereby when any of the pegs have been incorrectly pocketed in any one or more sockets, said lid cannot be properly closed and fastened in place.

2. The toy defined in and according to claim 1, and wherein the stated indicia for each socket comprises a marker, for example, a label of a given color.

3. The toy according to claim 1, and wherein the stated indicia comprises an inscribed word, for example, the word "red" whereby to teach the observer not only color recognition but the word itself, how to spell it, and to simultaneously learn how to associate words and colors and solve the puzzle while doing so.

4. The toy according to claim 1 and in combination, a peg retrieving implement and means carried by said implement which is adapted for use in extracting short pegs from deep sockets in which they are inadvertently inserted.

5. The toy according to claim 1, and wherein a peg retrieving implement is provided and is capable of use in extracting short pegs from deep sockets in which they were inadvertently inserted, said implement comprising an auxiliary peg, longer than any of the regularly usable color pegs, and provided at one end with a permanent magnet and being of the same cross-section as the regular pegs, said regular pegs being made of magnetizable metal.

6. The toy according to claim 1, and, in combination, the marginal edge portions of the top side of said block having an upstanding frame-like encompassing rim open at one end, the opposed lengthwise components of said rim having inwardly facing grooves providing keyways, said lid being attachably and detachably slidable in said keyways and, when fully closed, covering said sockets and pegs provided that the right pegs are in correct sockets, said lid having a carrying handle and, in addition, a hole at one end through which an upper projecting end of the auxiliary peg is adapted to extend in a manner to retain the lid in its closed position.

7. The toy according to claim 1, and, in combination, fastening means for hingedly mounting said lid on the top side of said block, the top side of said block having a recess in which said auxiliary peg can be pocketed and stored when not in use, said lid being capable of assuming its intended closed position only if and when the pegs have been inserted correctly in their proper sockets, whereby the lid serves not only as a cover but lets the child user know that the puzzle has not been worked out and solved, that is, when the lid is propped partly open by an incorrectly pocketed peg.

References Cited

UNITED STATES PATENTS 2,623,303  12/1952  Mindel.

OTHER REFERENCES

Dr. Montessori's Own Handbook, Copyright 1914, Frederick Stokes Co., Publishers, LB1169.M763, pages 29, 30, 41 and 42 and FIG. 7.

EUGENE R. CAPOZIO, Primary Examiner

W. H. GRIEB, Assistant Examiner

U.S. Cl. X.R.

273—160